United States Patent
Lamm

(10) Patent No.: US 8,021,792 B2
(45) Date of Patent: Sep. 20, 2011

(54) FUEL CELL SYSTEM HAVING AT LEAST ONE FUEL CELL

(75) Inventor: Arnold Lamm, Elchingen (DE)

(73) Assignee: Daimler AG, Stuttgart (DE)

( * ) Notice: Subject to any disclaimer, the term of this patent is extended or adjusted under 35 U.S.C. 154(b) by 1128 days.

(21) Appl. No.: 11/793,256

(22) PCT Filed: Nov. 28, 2005

(86) PCT No.: PCT/EP2005/012680
§ 371 (c)(1),
(2), (4) Date: Jun. 18, 2007

(87) PCT Pub. No.: WO2006/072291
PCT Pub. Date: Jul. 13, 2006

(65) Prior Publication Data
US 2008/0075994 A1    Mar. 27, 2008

(30) Foreign Application Priority Data
Dec. 23, 2004  (DE) .......................... 10 2004 062 055

(51) Int. Cl.
*H01M 8/06* (2006.01)
*H01M 8/04* (2006.01)
*H01M 8/24* (2006.01)

(52) U.S. Cl. ......... 429/414; 429/413; 429/544; 429/434

(58) Field of Classification Search .................. 429/408, 429/413–417, 427–435, 443–444, 446–449, 429/452, 456–457, 512–514, 545, 544
See application file for complete search history.

(56) References Cited

U.S. PATENT DOCUMENTS

| | | | |
|---|---|---|---|
| 5,503,944 A | 4/1996 | Meyer et al. | 429/13 |
| 6,124,054 A | 9/2000 | Gorman et al. | 429/34 |
| 6,511,052 B1 | 1/2003 | Tonkin et al. | 261/101 |
| 6,887,609 B2 * | 5/2005 | Kaufmann | 429/433 |
| 7,087,328 B2 * | 8/2006 | Shimanuki et al. | 429/414 |
| 2004/0053105 A1 | 3/2004 | Blank et al. | 429/38 |

FOREIGN PATENT DOCUMENTS

| | | |
|---|---|---|
| DE | 197 21 817 | 12/1998 |
| DE | 100 55 253 | 5/2002 |
| DE | 102 01 302 | 8/2002 |
| DE | 100 24 570 | 4/2004 |
| DE | 103 46 594 | 5/2005 |
| DE | 10 2004 058 117 | 6/2006 |
| EP | 0 951 087 | 10/1999 |
| JP | 2003017097 A * | 1/2003 |
| WO | WO 01/11216 | 2/2001 |
| WO | WO 02/37587 | 5/2002 |

OTHER PUBLICATIONS

Machine Translation and Abstract in Englsih of JP 2003-017097.*

* cited by examiner

*Primary Examiner* — Barbara Gilliam
*Assistant Examiner* — Claire L Roe
(74) *Attorney, Agent, or Firm* — Davidson, Davidson & Kappel, LLC

(57) ABSTRACT

A fuel cell system (1) including at least one fuel cell (2) having a cathode area (3) and an anode area (4) is disclosed. The cathode area (3) and the anode area (4) have feed conduits (31, 41) and discharge conduits (32, 42). Downstream of the anode area (4) and the cathode area (3), a junction (12) of the discharge conduits (32, 42) is provided. The junction (12) fluidically communicates with an area (13) which includes a material that is catalytically active with respect to a reaction of a fuel for the fuel cell (2) with an oxidant for the fuel cell (2). The feed conduit (31) leading to the cathode area (3) is configured in such a manner that it fluidically communicates with the cathode area (3) in at least two different sites (19, 20) in each of the fuel cells (2). A humidifying device (16) is provided in the feed conduit (41) leading to the anode area (4).

7 Claims, 2 Drawing Sheets

FUEL CELL SYSTEM HAVING AT LEAST ONE FUEL CELL

The present invention relates to a fuel cell system having at least one fuel cell, which includes a cathode region and an anode region, the cathode region and the anode region each having inflow and outflow lines.

BACKGROUND

From the U.S. Pat. No. 6,124,054, a fuel cell system is known, in which the waste gases emerging from the anode and the cathode region are made to converge and are fed to a catalytic conversion process. The underlying difficulty regarding humidification is only discussed in detail in the U.S. Pat. No. 5,503,944 A1 referenced therein. It describes carrying out the humidification process from an ultrapure-water (cooling) circuit through the cathode flow fields having a porous design. Thus, the gases are supplied in a dry process. However, it is difficult to protect such an ultrapure-water circuit from frost, so that it has considerable disadvantages with regard to its suitability for temperatures below the freezing point. Such humidification processes are certainly not conceivable in mobile applications, such as in vehicles.

A similar type of design is also known from the German Patent Application DE 100 24 570 A1. It provides for additionally directing the waste gases from the catalytic combustion to an expander in order to utilize the residual energy contained in the same. It also describes an anode design where the active surface area of the anode is reduced by at least one step in the direction of fuel flow, so that the fuel is utilized at a higher proportion in the fuel cell. A comparable approach providing this type of cascading anode design is also derived from the German Patent Application DE 197 21 817 A1.

Neither of the two last-mentioned publications allow for the underlying difficulty regarding humidification which, however, is essential for the operation of a PEM fuel cell. Namely, if a gas stream is directed to a PEM fuel cell which has not been humidified, thus which is able to absorb water from the PEM (proton-conducting membrane or polymer electrolyte membrane), it dries out the PEM. It is effectively damaged as a result.

For that reason, the International Patent Application WO 01/11216 A2 describes humidifying the gas streams using membrane humidifiers. However, these devices are very large and costly, in particular when air is used as an oxidant stream, due to the comparatively large volume to be humidified that also includes inert components. This constitutes a significant disadvantage for low cost, compact fuel cell systems, as are required in vehicles, for example, for purposes of energy supply and propulsion.

In addition, from the German Examined Application DE 100 55 253 B4, as well as the non-prepublished German Applications DE 103 46 594 and DE 10 2004 058 117 of the Applicant, supplementary cathode components are known, which make it possible to reduce the outlay required for humidifying the oxidant by providing appropriate flow guidance therefor. These supplementary components of the oxidant distributor structures, denoted as "injection flow field," allow the oxidant to flow into the cathode in each of the fuel cells at least two different locations. This reduces the volumetric flow at each of the inflow locations, thereby minimizing the risk inherent to the particular inflow region of the oxidant, of the PEM drying out at certain spots. Finally, the components allow water retention in the region of the cathode, thereby reducing the demands placed on the humidification process.

SUMMARY OF THE INVENTION

It is, therefore, an object of the present invention to further simplify a fuel cell system having at least one fuel cell, which includes a cathode region and an anode region, in a way that will provide a more compact, simpler, and less costly design and, at the same time, a most effective possible energy balance.

By employing the injection flow fields described above, the fuel cell system according to the present invention succeeds in retaining a comparatively large quantity of water in the cathode region in or at the PEM. Thus, in conjunction with the fuel humidified in accordance with the present invention, the need for humidifying the oxidant, i.e., typically air, may be altogether eliminated. The fuel humidifier may be designed to be a very small unit, which is more compact and less costly than would be required for a cathode air humidifier. Moreover, a small humidifier of this kind may be more readily accommodated in a system that is packed closely together in a narrow space, as is required, in particular, in vehicles for purposes of energy supply and propulsion.

This effect is also enhanced by the fact that the fuel, for example, nearly pure hydrogen from a storage tank used as a hydrogen source, is not circulated through an anode circuit as is frequently the case. Instead, the unreacted residual fuel exits the anode region directly. This residual fuel is then fed, together with the residual oxidant from the cathode region, for example oxygen-enriched air, to a region having the catalytically active material. On the one hand, this prevents unreacted hydrogen from being released from the system into the ambient environment; on the other hand, the residual energy contained in the waste gas is at least thermally utilized. This significantly reduces the volumetric flow of the fuel as compared to an anode circuit circulation. This, in turn, is associated with a very advantageous reduction in the required humidifier size.

Thus, the fuel cell system according to the present invention may be designed to be very simple, efficient, compact and cost-optimized.

Another embodiment of the fuel cell system according to the present invention provides that the region having the catalytically active material be in fluid communication with a fluid flow machine.

Typically, a catalytic combustion of the residual fuel with the residual oxidant takes place in the region having the catalytically active material. Thermal energy, primarily in the form of hot waste gases, is produced in the process. These hot waste gases are then able to expand in the fluid flow machine. The thus derived mechanical energy may be utilized either directly, for example, to at least assist in driving a pump-type device for the oxidant and/or indirectly to generate electrical energy via a generator.

Another embodiment of the present invention provides that the active surface of the anode region be reduced from the inflow line in the direction of the outflow line.

Due to this continuous or stepped reduction or cascading of the anode surface in the direction of fuel flow, the same active surface (membrane, electrocatalyst, electrode) is always available for the (still) present fuel volume for each volume fraction in the anode region. The fuel used may nevertheless be substantially reacted when working with an anode region that is minimized with respect to size or surface area.

Typically, unreacted residual fuel on the order of less than 5% of the original fuel volume is realistic when working with two to four steps of the cascading configuration. When a volumetric fuel flow is optimized in this manner, a humidifier of the above described type, which is smaller by a factor of ten than an air-side humidifier, then suffices for the fuel.

Another advantageous embodiment of the fuel cell system according to the present invention may also provide for the humidifier to have inflow ports and outflow ports for two mass flows separated by a membrane that is essentially only permeable to water or water vapor.

Membranes of this kind, which are only permeable to water, typically in the form of water vapor, and which prevent the passage of hydrogen, oxygen, nitrogen, carbon dioxide, etc. therethrough, are known, for example, from the International Patent Application WO 01/11216 mentioned above. They may also be designed as flat membranes, hollow fibers or the like.

Besides likewise conceivable, cyclical absorption or adsorption humidifiers, in which the gas stream to be humidified and the gas stream supplying the humidity alternately traverse two spaces provided with absorbers or adsorbers, or humidifiers in which the gas flows through liquid water, the membrane humidifiers constitute a variant of humidifiers that are very compact, simple in terms of interconnection and efficient.

One beneficial refinement derived therefrom may provide for the humidifier to be configured in a way that allows it to be traversed, on the one hand, by the already present moist waste gas from the cathode region and, on the other hand, by the fuel to be humidified. In this context, the waste gas flows from the cathode region, then first through the humidifier, before arriving in the region having the catalytically active material.

Here the advantage is derived that a potential membrane leakiness to the fuel is not critical (in the case of hydrogen, low leakage rates are certainly not to be completely ruled out due to the small molecular sizes), since the fuel diffusing through to the air side is subsequently still directed to the region having the catalytically active material, and is coreacted there. Thus, the fuel is neither released into the ambient environment, nor does its energy content remain unused.

BRIEF DESCRIPTION OF THE DRAWINGS

Other advantageous embodiments of the present invention are described below with reference to the drawing, whose figures show.

DETAILED DESCRIPTION

Figure 1:
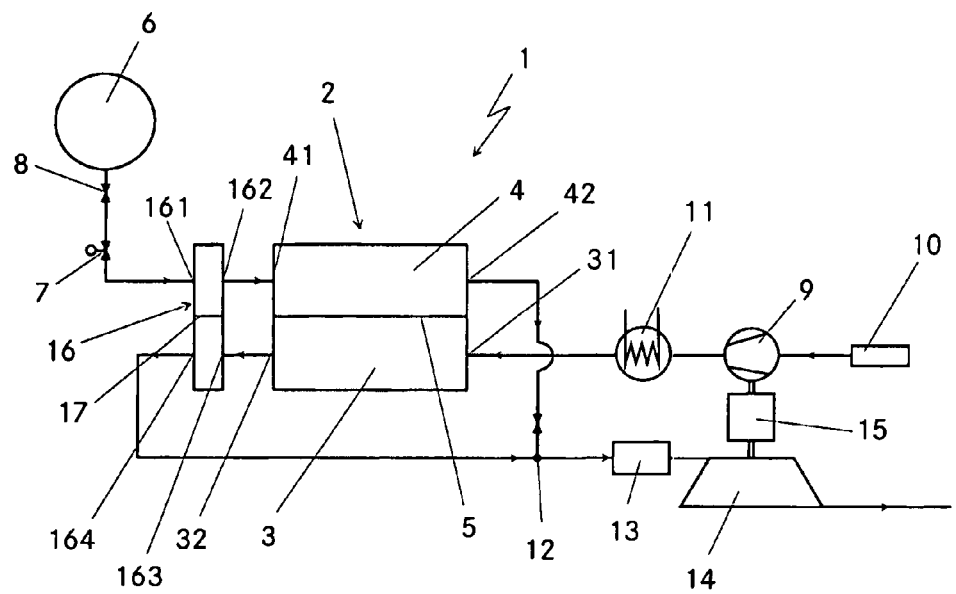
FIG. 1: a schematic representation of a first specific embodiment of the fuel cell system according to the present invention.

A fuel cell system 1 is shown schematically in FIG. 1. It includes a fuel cell 2, which, in this case, is to be assembled from a plurality of individual cells to form a PEM fuel cell stack. Fuel cell 2 includes a cathode region 3 and an anode region 4, which are separated from one another by a PEM 5. Both cathode region 3, as well as anode region 4 have an inflow line 31, 41, as well as an outflow line 32, 42, respectively.

During operation of the fuel cell, a fuel, for example nearly pure hydrogen, is supplied via inflow line 41 to anode region 4. In the exemplary embodiment shown here, this fuel originates from a fuel source 6, for example a hydrogen pressure tank. The volumetric flow and the pressure of the fuel arriving in anode region 4 are adjusted via suitable valve devices 7 and pressure-reduction devices 8. Via a pump-type device 9, air is fed as oxidant to cathode region 3 through its inflow line 31. This air originates from the ambient environment of fuel cell system 1 and is typically drawn in by pump-type device 9 via an air filter 10, as well as possibly via a sonic silencer (not shown). Moreover, a heat exchanger 11 may be expediently provided as an intercooler between pump-type device 9 and cathode region 3.

The air is then reacted together with the fuel in fuel cell 2 in the usual manner known per se to generate electric power. The waste gases from this reaction exit cathode region and, respectively, anode region 3, 4 through respective outflow lines 32, 42. The waste gases are then mixed together in the region of a junction 12 and fed to a region 13 having a catalytically active material where the residual fuel reacts to completion with the residual oxidant. Hot waste gases are produced by this reaction in region 13, referred to, in short, as catalyst in the following. Downstream of catalyst 13, these hot waste gases are directed into a fluid flow machine 14 where they expand. The mechanical energy thus derived from the hot waste gas is supplied either to a generator 15 and/or to pump-type device 9. In this context, it is particularly advantageous when the unit made up of fluid flow machine or expander 14, pump-type device 9 and generator or electrical machine 15, is designed as an electric turbocharger in such a way that, depending on how much energy expander 14 supplies, pump-type device 9 is operated either solely by the expander or with the assistance of electrical machine 15 in motor operation. When the expander supplies more energy than required by pump-type device 9, then electrical energy may also be directly produced by electrical machine 15 in generator mode.

Moreover, the combination of anode region 4 traversed by the fuel, and catalyst 13 has the positive effect that no unburnt fuel is released into the ambient environment. In addition, as a result of the reaction in catalyst 13 including downstream fluid flow machine 14, such a high waste gas temperature is able to be reached, that no liquid water escapes from the system. This is very beneficial in mobile applications, in particular, since liquid water is not released into the components of the exhaust-system branch, nor into the ambient environment. Otherwise, safety problems could arise in road traffic, since the water could freeze, for example, and/or damage the road pavement.

As is generally known, drying effects occur on PEM 5 during the operation of fuel cell 2. These effects are countered very effectively in two different ways in the case of fuel cell system 1 illustrated here. On the one hand, the supplied fuel is humidified in a humidifier 16. In this context, in the exemplary embodiment presented here, humidifier 16 is designed as a membrane humidifier. Humidifier 16 has a schematically indicated membrane 17, as well as two inflow ports 161, 163 and two outflow ports 162, 164. Membrane 17 is made of a material that is essentially only permeable to water or water vapor. Materials of this kind, such as hydrophilic membranes or the like, are known in principle from the International Patent Application WO 01/11216 A2 mentioned at the outset. At this point, the fuel flows from fuel source 6 through inflow port 161 into humidifier 16. There, it flows along membrane 17 and exits humidifier 16 through outflow port 162 to then flow into anode region 4 of the fuel cell. At the same time, for example in counterflow thereto, moist waste gas flows out of the cathode region through inflow ports 163 into humidifier 16. In the process, the moist waste gas releases water or water vapor through membrane 17 to the fuel, thereby humidifying the same before traversing outflow port 164 to reach junction 12.

Contrary to the customary humidifiers used for the substantially greater inflow of air to cathode region 3, humidifier 16 used for the fuel, as descrilbed here, may be designed to be much smaller and more compact.

It is especially beneficial that humidifier 16 is interconnected in a way that allows the outflowing waste gas of cathode region 3 to arrive in catalyst 13 while imparting moisture thereto. When hydrogen is used as fuel, a certain percentage of the fuel (up to 5% of the same) will, namely, always diffuse to the other side of the membrane, which essentially is only permeable to water or water vapor. Thus, at least a small quantity of hydrogen always reaches the dehumidified waste gas from cathode region 3. However, since this is first fed to catalyst 13 downstream of humidifier 16, this fuel may also be coreacted there, so that its energy content is utilized, thereby ensuring that no unburnt fuel is released into the ambient environment.

Figure 2:
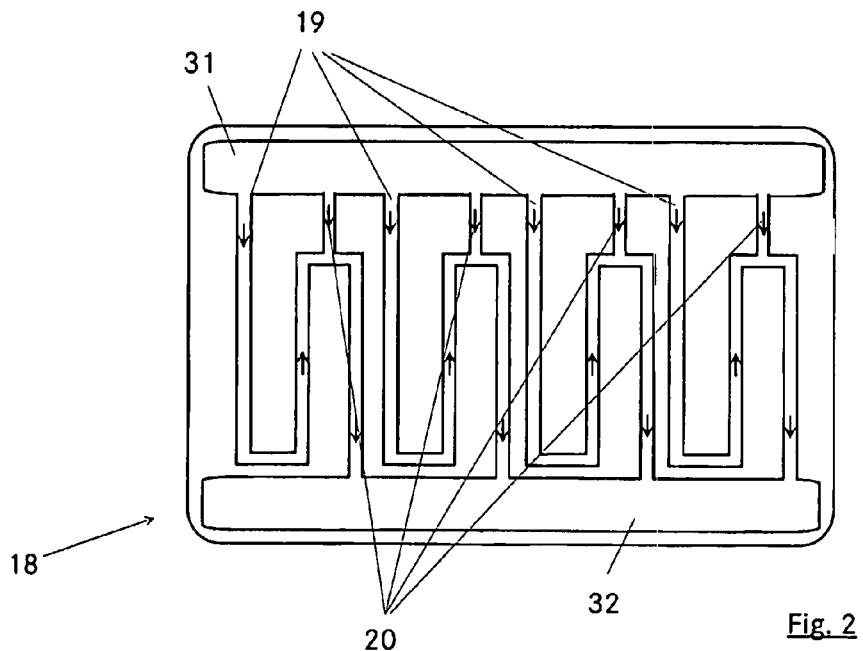
FIG. 2: a schematic representation of one possible embodiment of an oxidant distributor structure in the individual cells of the fuel cell.

In order to entirely eliminate the need for the much more costly process of humidifying the air flowing to cathode region 3 in conjunction with the fuel humidification, the design of cathode region 3 is such the air flows as oxidant into cathode region 3 in each individual cell at a plurality of different locations. An oxidant distributor structure 18 designed in this manner, i.e., a so-called flow field, for distributing the air over the cathode-side surface of PEM 5 is shown exemplarily in FIG. 2. One or more gas-carrying channels 19 configured in a meander shape branch off from inflow line 31 in the usual manner. In addition, following a certain path length, each of gas-carrying channels 19 features another fluid connection 20 between gas-carrying channel 19 and inflow line 31, through which fresh, unspent oxidant is able to arrive in gas-carrying channels 19. Thus, the air flows as oxidant into cathode region 3 at at least two different locations in each of gas-carrying channels 19. This reduces the volumetric flow at each of the inflow locations, thereby minimizing the risk inherent to the particular inflow region of the oxidant, of PEM 5 drying out at certain spots. Ultimately, this allows water to be retained in the region of PEM 5. Other supplementary components of this kind are derived from the German Patent Applications DE 100 55 253 B4, DE 103 46 594 and DE 10 2004 058 117 of the Applicant, as already mentioned at the outset.

In conjunction with the humidification of the fuel in humidifier 16, fuel cell 2 may be operated safely and reliably. Thus, by combining humidifier 16 for the fuel and appropriately designed oxidant distributor structure 18, the need is eliminated for the other humidification measures commonly used in known methods heretofore.

The configuration whereby anode region 4 is interconnected to fuel inflow and outflow lines 41, 42 is much simpler, more compact and thus less costly and more efficient than, for example, a so-called anode loop, where excess fuel is supplied and is then recirculated via a return line from outflow line 42 into inflow line 41 using costly blowers. However, in the case of the "open" interconnection of anode region 4 described here, a certain quantity of unspent fuel is always discharged from fuel cell 2 into catalyst 13. However, since the energy yield in fuel cell 2 is typically higher than in the design composed of catalyst 13 and fluid flow machine 14, the goal must be to keep this quantity as low as possible.

Figure 3:
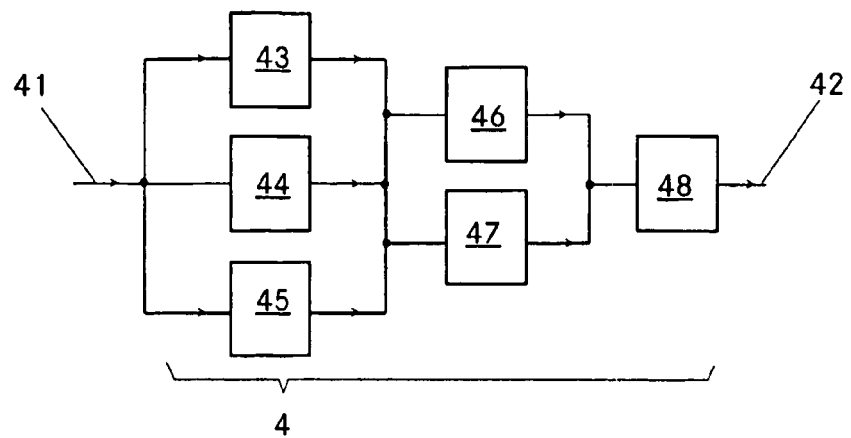
FIG. 3: a schematic representation of the anode-side interconnection of the fuel cell.

To accomplish this and, nevertheless, ensure a good functionality of fuel cell 2, a cascading of anode region 4 is implemented for fuel cell system 1. A design of this kind is indicated schematically in FIG. 3. In the cascading arrangement, individual sections 43, 44, 45, 46, 47, 48 of anode region 4, which are equal in area, are configured in such a way that the fuel, coming from inflow line 41, first flows in parallel through a first number of sections 43, 44, 45. It subsequently flows, likewise in parallel, through another smaller number of sections 46, 47, as well as, if indicated, through still another even smaller number of sections 48. Due to this cascading of individual sections 43, 44, 45, 46, 47, 48 of anode region 4 of fuel cell 2, given an excellent performance of fuel cell 2, it may be achieved that only a minimum of total excess fuel is needed, since the active surface of anode region 4 per volume fraction of fuel remains approximately the same over the entire anode region 4. Thus, a sufficient amount of excess fuel is available for reaction to each of sections 43, 44, 45, 46, 47, 48. Nevertheless, the total excess and thus the quantity of unreacted fuel is minimized. Based on initial calculations and trials, values on the order of less than 5% of the fuel drawn from fuel source 6 appear to be realistic for a residual quantity of unreacted fuel.

Figure 4:
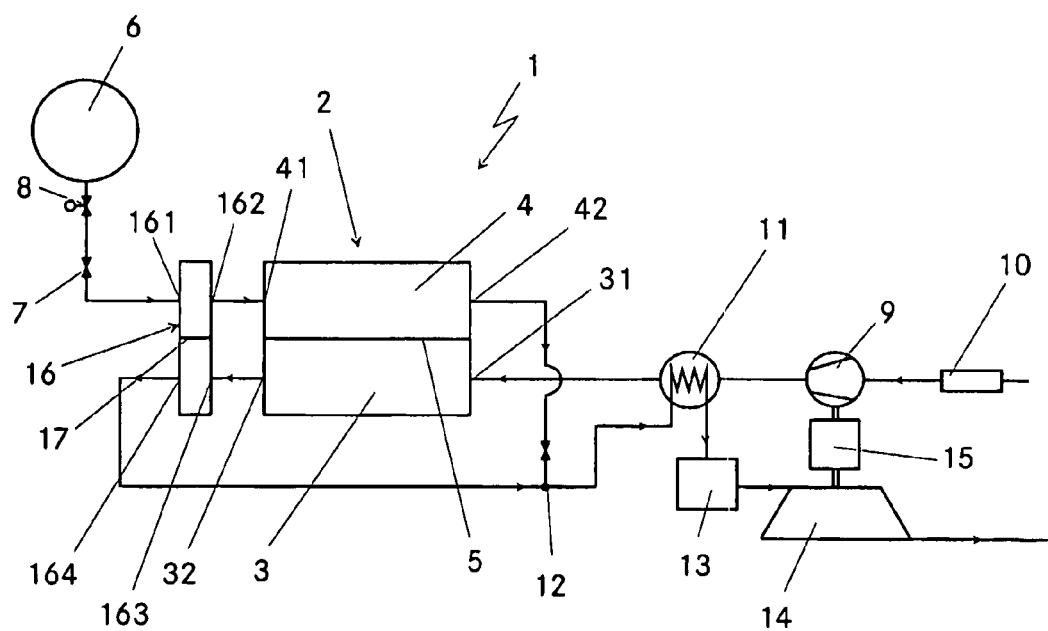
FIG. 4: a schematic representation of an alternative specific embodiment of the fuel cell system according to the present invention.

One alternative specific embodiment of fuel cell system 1 is shown in FIG. 4. It differs from the described specific embodiment merely in that the heat originating from heat exchanger 11 is likewise supplied to fluid flow machine 14. To that end, prior to entering into catalyst 13, the waste-gas stream is utilized to cool the compressed air in heat exchanger 11. Thus, higher waste gas temperatures are attainable downstream of catalyst 13, thereby permitting a higher energy yield for the fluid flow machine. Besides the design illustrated here, merely one of the waste gas streams, for example the waste gas stream having a significantly greater volume from cathode region 3, may be utilized for cooling the compressed air. All other embodiments and advantages are analogous to those of fuel cell system 1 described in FIG. 1.

What is claimed is:

1. A fuel cell system comprising: at least one fuel cell including a cathode region and an anode region, the cathode region having a cathode inflow line and a cathode outflow line and the anode region having an anode inflow line and an anode outflow line, a junction of the anode and cathode outflow lines being provided downstream of the anode region and the cathode region, the junction being in fluid communication with a first region, the first region including a catalytically active material with respect to a reaction of a fuel for the fuel cell with an oxidant for the fuel cell, a distributor structure for each of the at least one fuel cell coupling the cathode inflow line to at least two different locations of the cathode region, a humidifier being arranged in the anode inflow line, the humidifier having a first inflow port and a second inflow port and a first outflow port and a second outflow port for two mass flows separated by a membrane, the membrane being essentially only permeable to water or water vapor, the first inflow port communicating with a fuel source, the first outflow port in fluid communication with the first inflow port, the first outflow port being connected to the anode inflow line, the second inflow port connected to the cathode outflow line, and the second outflow port in fluid communication with the second inflow port and being connected to the junction.

2. The fuel cell system as recited in claim 1 wherein the first region is in fluid communication with a fluid flow machine.

3. The fuel cell system as recited in claim 1 wherein an active surface of the anode region is reduced from the anode inflow line in the direction of the anode outflow line.

4. The fuel cell system as recited in claim 1 wherein the fuel source is a hydrogen storage tank.

5. The fuel cell system as recited in claim 1 wherein an oxidant is able to be supplied through the inflow line via a pump-type device to the cathode region.

6. The fuel cell system as recited in claim 5 wherein the oxidant is air.

7. The fuel cell system as recited in claim 5 further comprising a heat exchanger traversable by the oxidant and, by at least one waste gas streaming to the first region, the heat exchanger being arranged between the pump-type device and the cathode region, the oxidant being compressed oxidant.

* * * * *